117,987

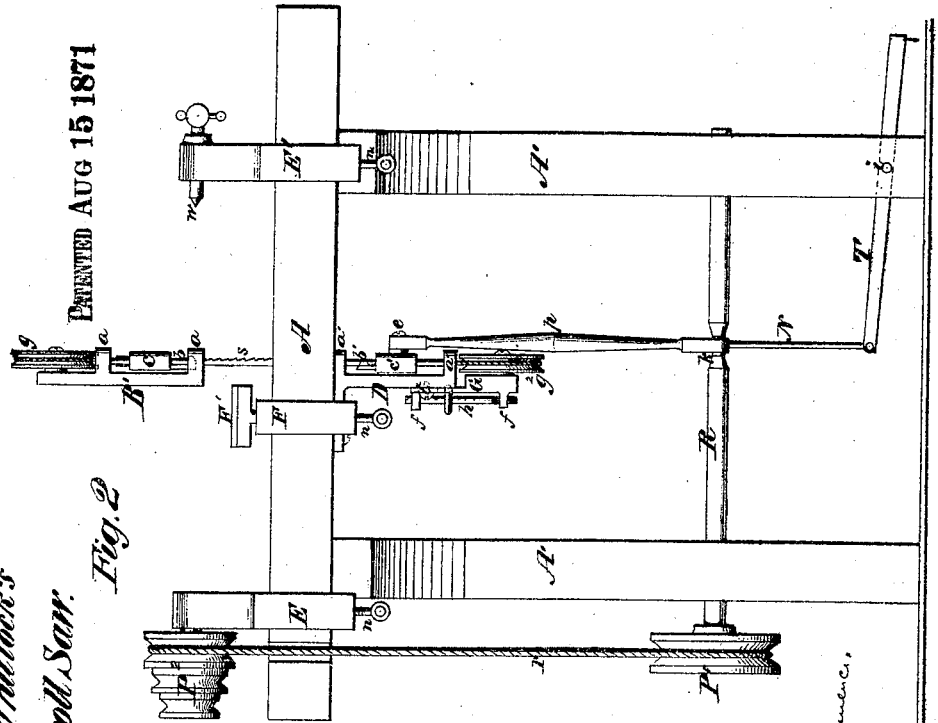
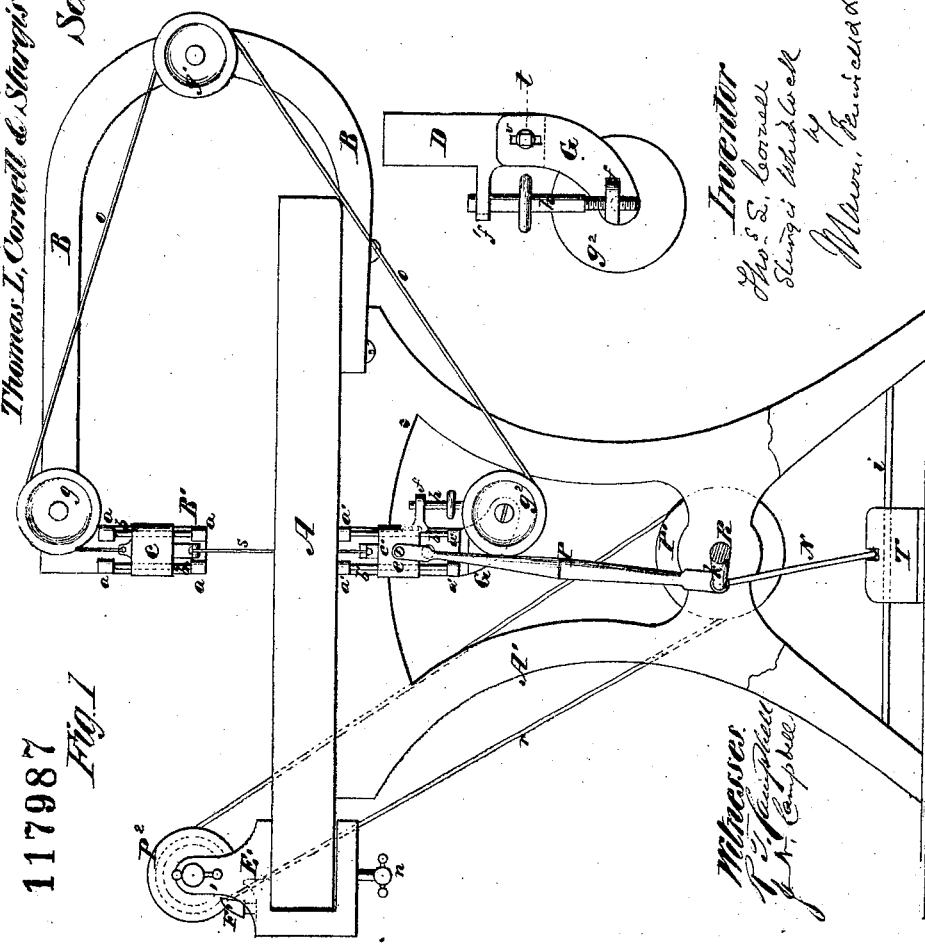

UNITED STATES PATENT OFFICE.

THOMAS L. CORNELL AND STURGES WHITLOCK, OF DERBY, CONNECTICUT, ASSIGNORS TO THOMAS L. CORNELL.

IMPROVEMENT IN SCROLL-SAWS.

Specification forming part of Letters Patent No. 117,987, dated August 15, 1871.

*To all whom it may concern:*

Be it known that we, THOMAS L. CORNELL and STURGES WHITLOCK, of Derby, in the county of New Haven and State of Connecticut, have invented certain new and useful Improvements Applicable to Scroll-Saws; and we do hereby declare that the following is a full, clear, and exact description thereof, reference being had to the accompanying drawing making part of this specification, in which—

Figure 1 is an elevation of the front of the machine. Fig. 2 is an elevation of one side of the machine. Fig. 3 is a view of the lower belt-pulley bearing.

Similar letters of reference indicate coresponding parts in the several figures.

This invention relates to certain novel improvements which are especially applicable to scroll-saws of that class wherein the saw is held under tension between head and tail-blocks by means of a belt which plays over pulleys, substantially as explained in the schedule annexed to the Letters Patent of Reuben McChesney, dated on the 1st day of November, 1871.

The following description will enable others skilled in the art to understand it.

In the accompanying drawing, A A' represent the saw-table, and B is a curved bracket or gooseneck, which is secured fast to the under side of the table-top A, and curved so as to overhang the same and support the guides for the head-block $c$. This bracket B, attached rigidly to the saw-table, allows the machine to be moved about and does not confine it to one place, as is the case where the guides for the upper end of the saw are applied to floor-timbers overhead. The saw $s$ is sustained between head and tail-blocks $c$ $c'$, to which blocks a flexible straining-belt, $o$, is secured, which passes around three pulleys, $g$ and $g^1$ and $g^2$. The block $c$ is guided by means of rods $b$, the ends of which are fixed to lugs $a$ on the vertical portion B' of the bracket B. The tail or foot-block $c'$ is guided by rods $b'$, which are fixed to lugs $a'$ on a bracket, D. This bracket D is secured rigidly to the under side of the table-top A in proper relation to the vertical portion of the goose-neck B. The two pulleys $g$ $g^1$ above the table have fixed bearings on the front side of the goose-neck B, but the pulley $g^2$ beneath the table has its bearing on the front side of a curved foot-piece, G, which is connected to the bracket D by means of a set-screw, $t$, which passes through a vertically-oblong slot, $v$. $h$ is an adjusting-screw, which is tapped through a lug, $f$, on the foot-piece G, and is held above by a lug, $f'$, on the bracket D. By means of this screw $h$ the foot-piece $g$ can be readily adjusted so as to keep the bolt $o$ and saws under proper tension. The tail-block $c'$ is connected to the crank $k$ of a crank-shaft, R, by means of a pitman-rod, P, and to the same crank another rod, N, is connected, which extends down and is pivoted to a treadle, T, on a horizontal rod $i$. On one end of the crank-shaft R a pulley, P¹, is fixed, which communicates rotary motion to a cross-pulley, P², on a lathe-spindle by means of a bolt, $r$. This spindle has its bearings in a head-block, E, which is secured to the edge of the table-top A by means of jaws and a clamp-screw, $n$. A tool-rest, F', is applied to a clamp, F, also held by a screw, $n$, and a back center, W, is applied to a clamp or tail-block, E', which is also held fast by a set-screw, $n$.

It will be seen from the above description that the several parts which constitute a lathe are removable, and can be detached or attached to the table-top at pleasure.

When the lathe is used it can be operated by the treadle T after detaching the pitman-rod P from the shaft R, or the lathe can be operated by power applied to shaft R in any other manner. The saw can also be operated by the treadle or by other power applied to the shaft R. Thus it will be seen that the shaft R is made to serve two purposes.

We are aware that the feature, herein described, of straining a muley-saw by means of a belt is not new. Nor is it new with us to apply an adjusting device to one of the pulleys of a belt which holds a saw under tension. These features are shown in the patent of McChesney, above described.

What we have done is to improve the McChesney machine: First, by applying the bracket or goose-neck B to the saw-table, and thus making the machine portable. Second, by the combination of a simple adjusting device with one of the belt-pulleys. Third, by adapting a single driving-shaft to serve as a medium through which the saw can be driven either by a treadle or by any other power. Fourth, by combining with the saw-table and its crank-shaft a removable lathe.

Having described our invention, what we claim as new, and desire to secure by Letters Patent, is—

1. The overhanging goose-neck B B′, saw $s$, belt $o$, belt-pulleys $g$ $g^1$ $g^2$, head and tail-blocks $c$ $c'$, and the bracket D, in combination with the adjustable foot-piece G, carrying belt-pulley $g^2$, substantially as described.

2. The arrangement of the lathe E, E′, W, and F′, saw-table A, crank-shaft R, saw $s$, pitman $p$, pulleys $P^1$ $P^2$, and belt $r$, as and for the purpose described.

THOMAS L. CORNELL.
STURGES WHITLOCK.

Witnesses:
EDWARD N. SHELTON,
CHAS. E. CLARK.